US008754605B2

(12) United States Patent
Ramu

(10) Patent No.: US 8,754,605 B2
(45) Date of Patent: Jun. 17, 2014

(54) POWER FACTOR CORRECTION CIRCUITS FOR SWITCHED RELUCTANCE MACHINES

(75) Inventor: Krishnan Ramu, Blacksburg, VA (US)

(73) Assignee: Regal Beloit America, Inc., Beloit, WI (US)

(*) Notice: Subject to any disclaimer, the term of this patent is extended or adjusted under 35 U.S.C. 154(b) by 328 days.

(21) Appl. No.: 13/287,221

(22) Filed: Nov. 2, 2011

(65) Prior Publication Data

US 2012/0104984 A1 May 3, 2012

Related U.S. Application Data

(60) Provisional application No. 61/409,638, filed on Nov. 3, 2010.

(51) Int. Cl.
*H02P 1/46* (2006.01)
(52) U.S. Cl.
USPC .............................. 318/701; 318/700; 318/746
(58) Field of Classification Search
USPC ................. 318/701, 700, 746, 778, 785, 786, 318/400.26
See application file for complete search history.

(56) References Cited

U.S. PATENT DOCUMENTS

| 7,271,564 | B2 | 9/2007 | Ramu | |
|---|---|---|---|---|
| 2007/0008744 | A1* | 1/2007 | Heo et al. | 363/17 |
| 2007/0182383 | A1* | 8/2007 | Park et al. | 322/89 |

FOREIGN PATENT DOCUMENTS

WO 2009/023205 2/2009

* cited by examiner

*Primary Examiner* — Karen Masih
(74) *Attorney, Agent, or Firm* — NSIP Law

(57) ABSTRACT

An electrical device has a capacitive storage element and first and second switches. The capacitive storage element and first and second switches are interconnected such that when interconnected with a direct current (dc) voltage supply and first and second windings of an electrical machine: (1) a first operational state exists in which conductive states of the first and second switches cause the dc voltage supply to conduct current through the first winding and the first switch and conduct current through the first and second switches and the second winding, respectively, thereby storing energy within the first and second windings, and (2) a second operational state exists in which non-conductive states of the first and second switches cause each of the first and second windings to discharge stored energy by conducting current through the capacitive storage element, thereby storing energy in the capacitive storage element.

41 Claims, 10 Drawing Sheets

POWER FACTOR CORRECTION CIRCUITS FOR SWITCHED RELUCTANCE MACHINES

This application claims priority to U.S. provisional application 61/409,638, filed on Nov. 3, 2010, the content of which is incorporated herein by reference.

BACKGROUND OF THE RELATED ART

Power factor is defined as the cosine of the phase angle between an instantaneous alternating current (ac) voltage and current, considering only fundamental values of the ac voltages and currents. Unity power factor is achieved when the phase angle between the voltage and current is zero. It is desired to have a unity power factor when drawing power from a utility, so that only real power is drawn, and no reactive power. A utility's investment for generation and distribution equipment will be minimized only if real power is drawn by users, which amounts to the user's power factor being unity.

Converters in the form of rectifiers distort ac current drawn from the utility supply, leading to non-sinusoidal current waveforms that introduce harmonics, other than the fundamental, that are undesirable to the operation of the utility, as well as contribute to additional losses that do not exist when only sinusoidal currents are drawn from the utility. Therefore, power factor correction is of importance for motor-drive applications in many countries because of regulations and incentives for manufacturers of electronics to build into their systems a capability for unity power factor operation and sinusoidal current draw.

Common ways to incorporate unity power factor operation and sinusoidal current draw are: (1) to provide a separate unity power factor correction (UPF) circuit, which is an expensive approach and takes additional space and volume for installation, and (2) operating a full-bridge controlled rectifier in boost mode, which is also an expensive solution. A solution was patented by Krishnan Ramu (U.S. Pat. No. 7,271,564, issued Sep. 18, 2007) for addressing these challenges; this solution employed a single transistor for controlling a two-phase machine. A disadvantage of the patented solution pertains to the limited torque-generating region of a two-phase machine. More specifically, when phase A is conducting, phase B must conduct also. The torque productions of these two phases are of opposite polarity, some of the time. Therefore, the torque production in a two-phase machine has a reduced output.

Although the currents in each phase of a two-phase machine may be made unequal, so the torque contributions from the two phases are unequal in magnitude, the net torque is also reduced. Moreover, the reduced torque is produced in every alternate torque-generation region of either phase A or B, whichever can produce the maximum torque compared to the other phase.

Assume the phase-B winding of a two-phase machine has less turns than the phase-A winding. The unequal number of turns between the phases makes phase B the auxiliary phase, with smaller torque generating capability compared to phase A. The net torque produced by the two is less in the machine with unequal number of turns compared to a machine with equal number of turns in the phase windings.

SUMMARY OF THE INVENTION

The invention disclosed herein overcomes the disadvantages of related-art devices with respect to unity power factor.

This and other objects of the invention may be achieved, in whole or in part, by an electrical device having a capacitive storage element and first and second switches. The capacitive storage element and first and second switches are interconnected such that when interconnected with a direct current (dc) voltage supply and first and second windings of an electrical machine: (1) a first operational state exists in which conductive states of the first and second switches cause the dc voltage supply to conduct current through the first winding and the first switch and conduct current through the first and second switches and the second winding, respectively, thereby storing energy within the first and second windings, and (2) a second operational state exists in which non-conductive states of the first and second switches cause each of the first and second windings to discharge stored energy by conducting current through the capacitive storage element, thereby storing energy in the capacitive storage element.

Additionally, the objects of the invention may be achieved, in whole or in part, by an electrical device having a capacitive storage element and a first switch. The capacitive storage element and first switch are interconnected such that when interconnected with a dc voltage supply and first and second windings of an electrical machine: (1) a first operational state exists in which a conductive state of the first switch causes the dc voltage supply to conduct current through the first winding and first switch, (2) a second operational state exists in which a non-conductive state of the first switch causes the first winding to discharge stored energy by conducting current through the capacitive storage element, thereby storing energy in the capacitive storage element, and (3) a third operational state exists in which the capacitive storage element discharges stored energy by conducting current through the second winding, thereby storing energy in the second winding.

Still further, the objects of the invention may be achieved, in whole or in part, by an electrical device having a capacitive storage element and first and second switches. The capacitive storage element and first and second switches are interconnected such that when interconnected with a dc voltage supply and first and second windings of an electrical machine: (1) a first operational state exists in which a conductive state of the first switch causes the dc voltage supply to conduct current through the first winding and first switch, (2) a second operational state exists in which a non-conductive state of the first switch causes the first winding to discharge stored energy by conducting current through the capacitive storage element and dc voltage supply, thereby storing energy in the capacitive storage element, (3) a third operational state exists in which a conductive state of the second switch causes the capacitive storage element to discharge stored energy by conducting current through the second winding, thereby storing energy in the second winding, and (4) a fourth operational state exists in which a non-conductive state of the second switch causes the second winding to discharge stored energy by conducting current through the first winding, thereby storing energy in the first winding.

Still further, the objects of the invention may be achieved, in whole or in part, by an electrical machine having: (1) a dc voltage supply that has first and second electrical terminals; (2) first and second windings of the electrical machine, each of the first and second windings having first and second electrical terminals; (3) a capacitive storage element that has first and second electrical terminals; (4) first and second switches that each has first and second electrical terminals; and (5) first, second, and third unidirectional current devices that each conducts current unidirectionally and has first and second electrical terminals. A first electrical node connects the first terminal of the dc voltage supply and first terminal of the first winding. A second electrical node connects the second terminal of the first winding, first terminals of the first switch and first unidirectional current device, and second terminal of the second unidirectional current device. A third electrical node connects the second terminal of the first unidirectional current device and first terminals of the capacitive storage element and second switch. A fourth electrical node connects the second terminal of the second switch, first terminal of the second winding, and second terminal of the third unidirectional current device. A fifth electrical node connects the second terminal of the second winding and first terminal of the second unidirectional current device. A sixth electrical node connects the second terminals of the dc voltage supply, first switch, and capacitive storage element and the first terminal of the third unidirectional current device.

Still further, the objects of the invention may be achieved, in whole or in part, by an electrical machine having: (1) a dc voltage supply that has first and second electrical terminals; (2) first and second windings of the electrical machine, each of the first and second windings having first and second electrical terminals; (3) a capacitive storage element that has first and second electrical terminals; (4) first and second switches that each has first and second electrical terminals; and (5) first and second unidirectional current devices that each conducts current unidirectionally and has first and second electrical terminals. A first electrical node connects the first terminal of the dc voltage supply and first terminal of the first winding. A second electrical node connects the second terminal of the first winding, first terminals of the first switch and first unidirectional current device, and second terminal of the second winding. A third electrical node connects the second terminal of the first unidirectional current device and first terminals of the capacitive storage element and second switch. A fourth electrical node connects the second terminal of the second switch, first terminal of the second winding, and second terminal of the second unidirectional current device. A fifth electrical node connects the second terminal of the dc voltage supply, second terminals of the first switch and capacitive storage element, and first terminal of the second unidirectional current device.

Still further, the objects of the invention may be achieved, in whole or in part, by an electrical machine having: (1) a dc voltage supply that has first and second electrical terminals; (2) first and second windings of the electrical machine, each of the first and second windings having first and second electrical terminals; (3) a capacitive storage element that has first and second electrical terminals; (4) first and second switches that each has first and second electrical terminals; and (5) first and second unidirectional current devices that each conducts current unidirectionally and has first and second electrical terminals. A first electrical node connects the first terminal of the dc voltage supply, first terminal of the first winding, and second terminals of the capacitive storage element and second winding. A second electrical node connects the second terminal of the first winding and first terminals of the first switch and first unidirectional current device. A third electrical node connects the second terminal of the first unidirectional current device and first terminals of the capacitive storage element and second winding. A fourth electrical node connects the second terminal of the second unidirectional current device and first terminal of the second winding. A fifth electrical node connects the second terminal of the dc voltage supply and second terminal of the first switch.

Still further, the objects of the invention may be achieved, in whole or in part, by an electrical machine having: (1) a dc voltage supply that has first and second electrical terminals; (2) first and second windings of the electrical machine, each of the first and second windings having first and second electrical terminals; (3) a capacitive storage element that has first and second electrical terminals; (4) first and second switches that each has first and second electrical terminals; and (5) first and second unidirectional current devices that each conducts current unidirectionally and has first and second electrical terminals. A first electrical node connects the first terminal of the dc voltage supply, first terminal of the first winding, and second terminal of the second unidirectional current device. A second electrical node connects the second terminal of the first winding and first terminals of the first switch and first unidirectional current device. A third electrical node connects the second terminal of the first unidirectional current device and first terminals of the capacitive storage element and second winding. A fourth electrical node connects the first terminals of the second switch and second unidirectional current device and second terminal of the second winding. A fifth electrical node connects the second terminals of the dc voltage supply, first and second switches, and capacitive storage element.

Still further, the objects of the invention may be achieved, in whole or in part, by a method of operating an electrical machine having first and second phase windings and a common winding. According to the method, a determination is made: (1) whether each of the first and second phase windings is being energized by the flow of current and (2) whether current flow through a capacitive storage element, which stores energy discharged by the de-energization of the first and second phase windings, is increasing, decreasing, or positive. Energy stored by the capacitive storage element is discharged through the common winding if the current flow through the capacitive storage element is determined to be increasing. And energy stored by the capacitive storage element is discharged through the common winding if the current flow through the capacitive storage element is determined to be a positive current flow and neither of the first and second phase windings is being energized. The discharge of energy stored by the capacitive storage element through the common winding is discontinued if the current flow through the capacitive storage element is determined to be decreasing and at least one of the first and second phase windings is being energized.

BRIEF DESCRIPTION OF THE DRAWINGS

Preferred embodiments of the invention are described in the following paragraphs of the specification and may be better understood when read in conjunction with the attached drawings, in which.

DETAILED DESCRIPTION OF THE INVENTION

Figure 1:
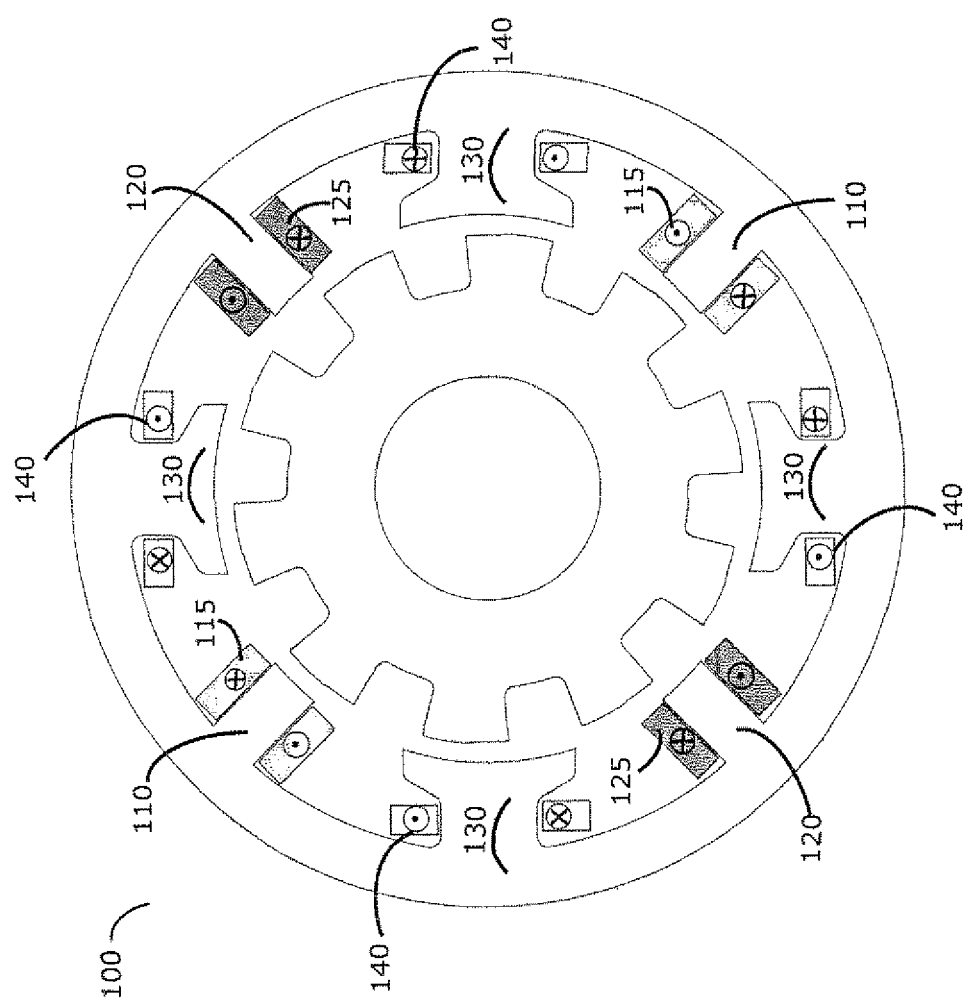
FIG. 1 illustrates a two-phase switched reluctance machine (SRM) having eight stator poles and ten rotor poles.

FIG. 1 illustrates a two-phase switched reluctance machine (SRM) having eight stator poles and ten rotor poles. SRM 100 has: (1) two stator poles 110 that are separated by 180 mechanical degrees and have phase-A windings 115 around them and (2) two stator poles 120 that are separated by 180 mechanical degrees and have phase-B windings 125 around them. Four windings 140 are disposed around four common poles 130 and constitute power factor correction (PFC) windings of the SRM; PFC windings 140 are substituted for an inductor within a PFC circuit. Common poles 130 carry flux, due to currents in the PFC or common windings 140, and thereby augment the flux provided by phase windings 115 and 125, thus generating increased torque. PFC windings 140 provide a physical inductor for PFC and enhance torque generation due to the flux they create on common poles 130. Additionally, with SRM 100: (1) no additional PFC inductor is required, as is required for conventional power PFC circuits and (2) the cooling of phase windings 115, 125 and PFC inductor 140 is accomplished by the cooling of SRM 100, thus replacing cooling management of two separate entities (i.e., motor and inductor) with only one entity, that of the motor.

Figure 2:
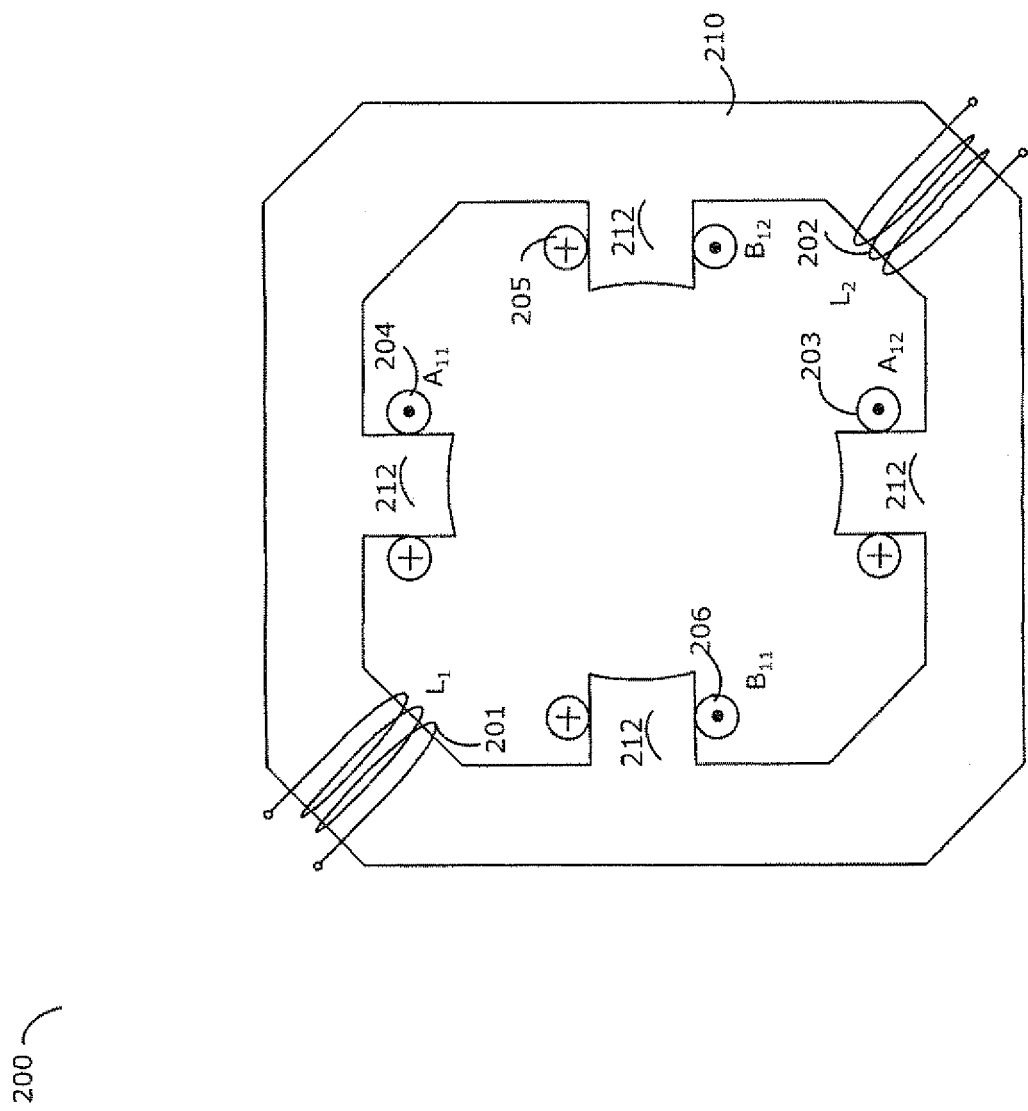
FIG. 2 illustrates common windings disposed on the stator of an SRM at locations where flux reversal does not occur.

FIG. 2 illustrates common windings disposed on the stator back iron of an SRM at locations where flux reversal does not occur during operation. Stator 200 has four stator poles 212. Phase windings 203 and 204 compose one phase, and phase windings 205 and 206 compose the second phase of the two-phase SRM. Phase windings 203-206 are wound around stator poles 212, and PFC windings 201 and 202 are wound around back iron 210 of stator 200 where the polarity of the flux does not reverse as phases switch during operation. PFC windings 201 and 202, when excited, will add to the flux generated by phase windings 203-206 and enhance torque production in the SRM.

Figure 3:
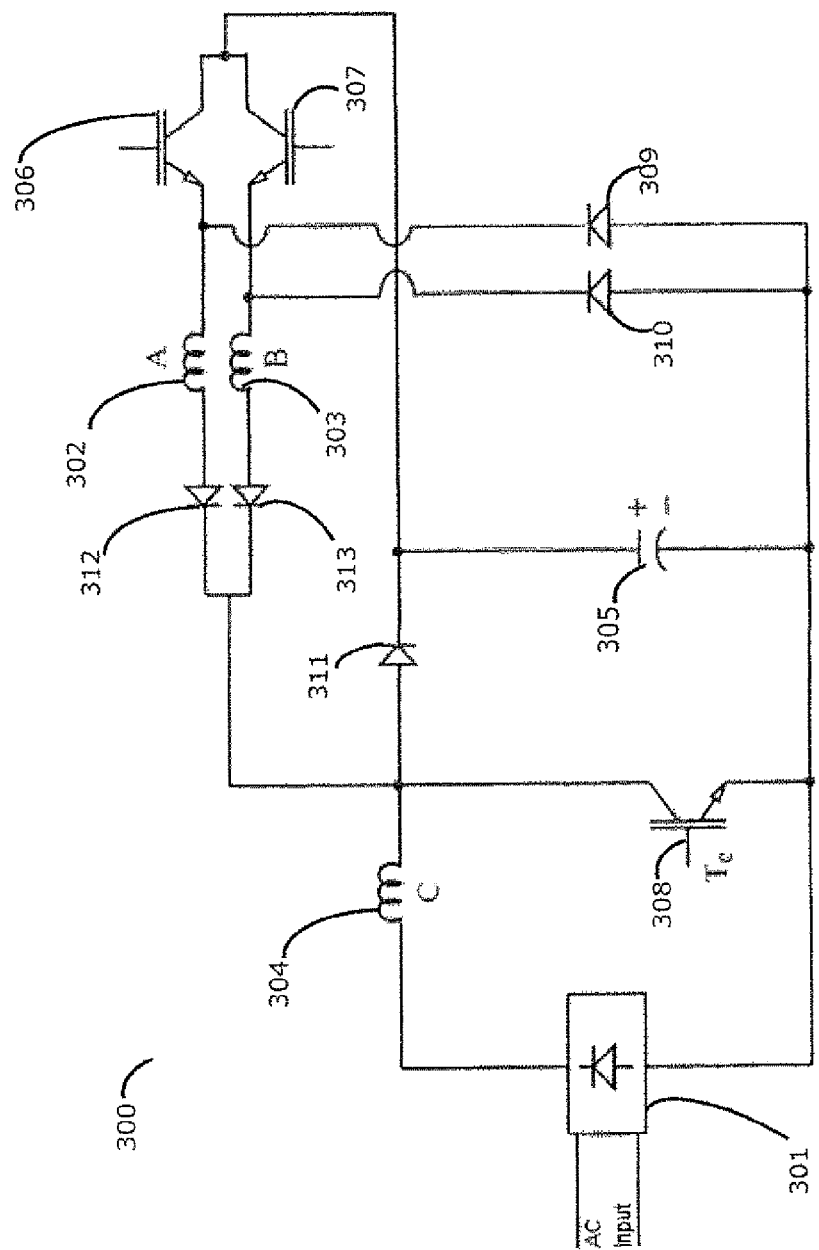
FIG. 3 illustrates a first embodiment of a power converter defined by the invention.

FIG. 3 illustrates a first embodiment of a power converter defined by the invention. Power converter 300 has one transistor 306, 307 for each phase winding 302, 303 and a third transistor 308 for a common winding 304. A full-diode-bridge rectifier 301 rectifies an alternating current (ac) voltage supply.

Phases A 302 and B 303 have the same number of windings. The phase- and common-coil arrangements disclosed in FIGS. 3, 4, and 6 of U.S. provisional patent application 60/955,661, the content of which is incorporated herein by reference, are suitable for use with power converter 300.

Transistors 306 and 308 are switched on to energize phase-A winding 302 and common winding 304. Transistor 308 is switched on and off to maintain a sine-wave current drawn from the ac supply through diode bridge 301 and common winding 304. When transistor 308 is switched off, current through phase-A winding 302 is freewheeling and a capacitor 305 is charged by the discharge of energy from windings 302 and 304. To commutate current from phase-A winding 302 rapidly, transistors 306 and 308 have to be switched off; current from phase-A winding 302 is conducted through diodes 311 and 312, capacitor 305, and diode 309, resulting in capacitor 305's voltage being applied to phase A, negatively. If transistor 308 is switched on while transistor 306 remains off, the applied voltage across phase A goes to zero because diode 311 stops conducting. In a state in which phase-A winding 302 is conducting current while transistor 306 is switched off and transistor 308 is switched on, current in phase-A winding 302 will freewheel and decay slowly. The flux generated by common winding 304, when energized, is always additive with the flux from both phases and aids torque generation.

The operation of phase B is similar to that of phase A. Phase-B winding is energized by the flow of current through common winding 304, diode 311, transistor 307, phase-B winding 303, diode 313, and transistor 308. Phase-B winding discharges stored energy through diodes 313, 311, and 310 and capacitor 305.

Figure 4:
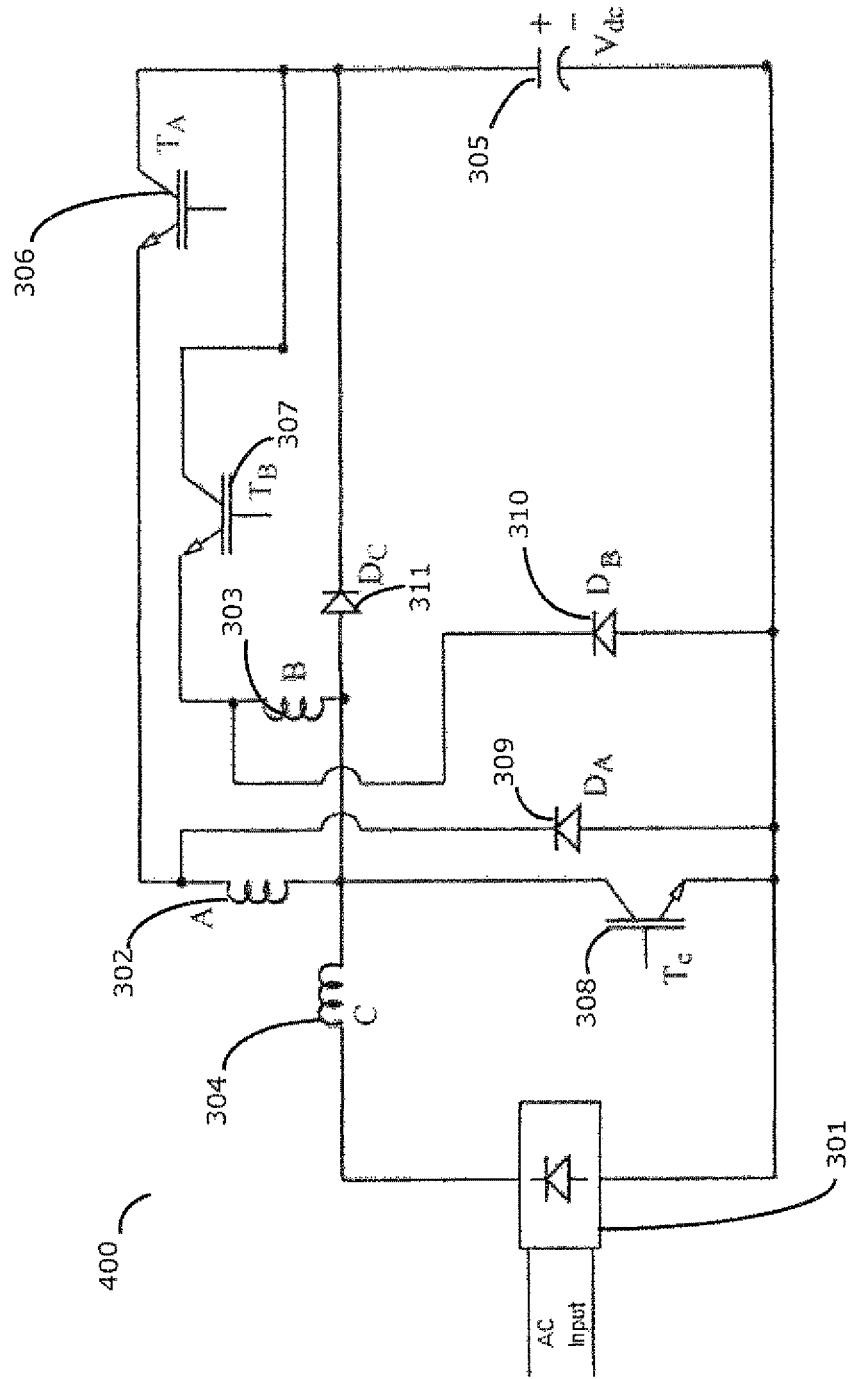
FIG. 4 illustrates a second embodiment of the power converter defined by the invention.

FIG. 4 illustrates a second embodiment of the power converter defined by the invention. Power converter 400 is identical to that of power converter 300 with diodes 312 and 313 removed, resulting in only three-freewheeling diodes and three transistors. The operation of power converter 400 is similar to that described for power converter 300.

Figure 5:
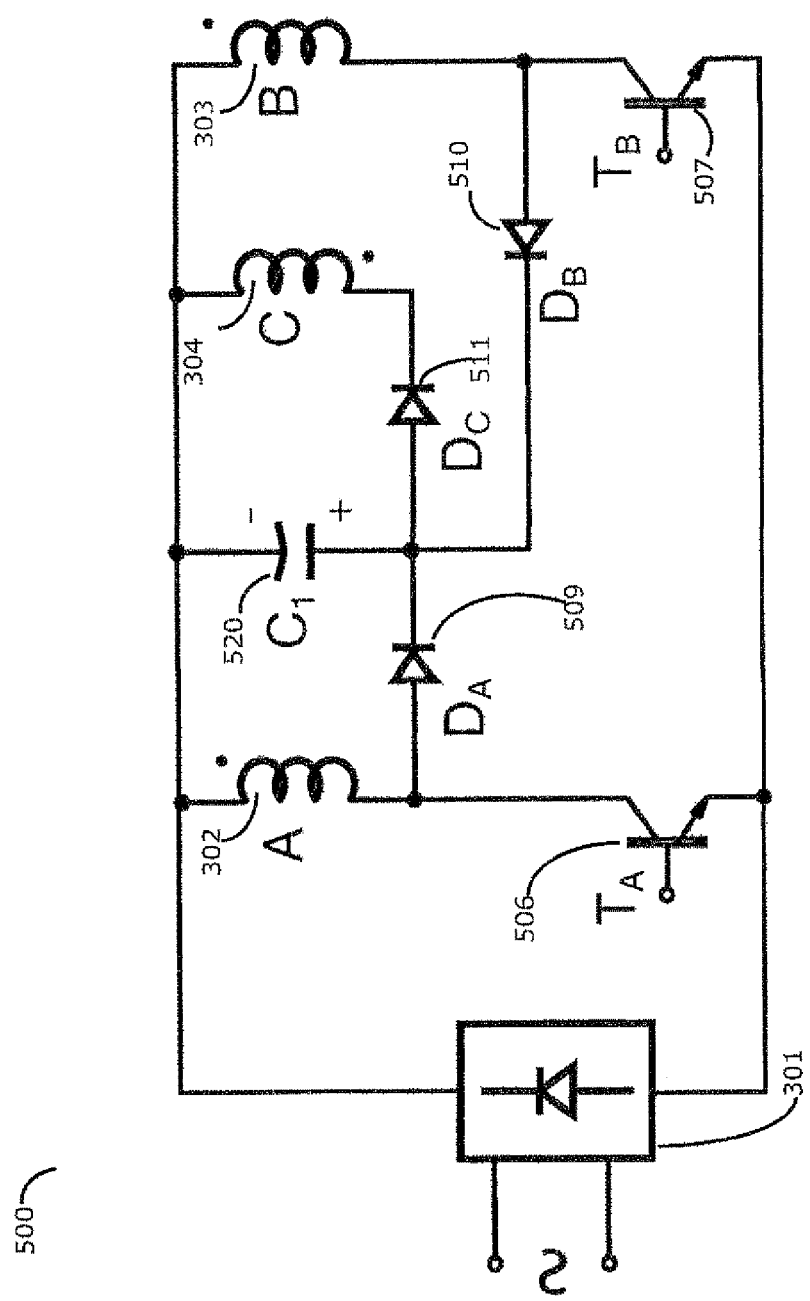
FIG. 5 illustrates a third embodiment of the power converter defined by the invention.

FIG. 5 illustrates a third embodiment of the power converter defined by the invention. Power converter 500 only requires one transistor per phase winding and has no direct current (dc) link capacitor. Power converter 500 has three freewheeling diodes 509-511, and common winding 304 does not have a transistor to control current through it.

Transistor 506 is switched on to build current in phase-A winding 302, which generates torque in a motor. Transistor 506 is also switched on to draw sinusoidal current from the ac supply. When transistor 506 is switched off, current in phase-A winding 302 commutates through diodes 509 and 511, charging a capacitor 520 and energizing common winding 304. After current has commutated from phase-A winding 302, energy stored in capacitor 520 is discharged through common winding 304.

The operation of phase-B winding 303 is similar to that of phase-A winding 302. Phase-B winding 303 is energized by the conduction of current through dc voltage supply 301, phase-B winding, and switch 507. Phase-B winding discharges stored energy by conducting a current through diode 510 and 511, capacitor 520, and common winding 304, thereby energizing capacitor 520 and common winding 304. Common winding 304 cannot be controlled independently of phases A and B.

Figure 6:
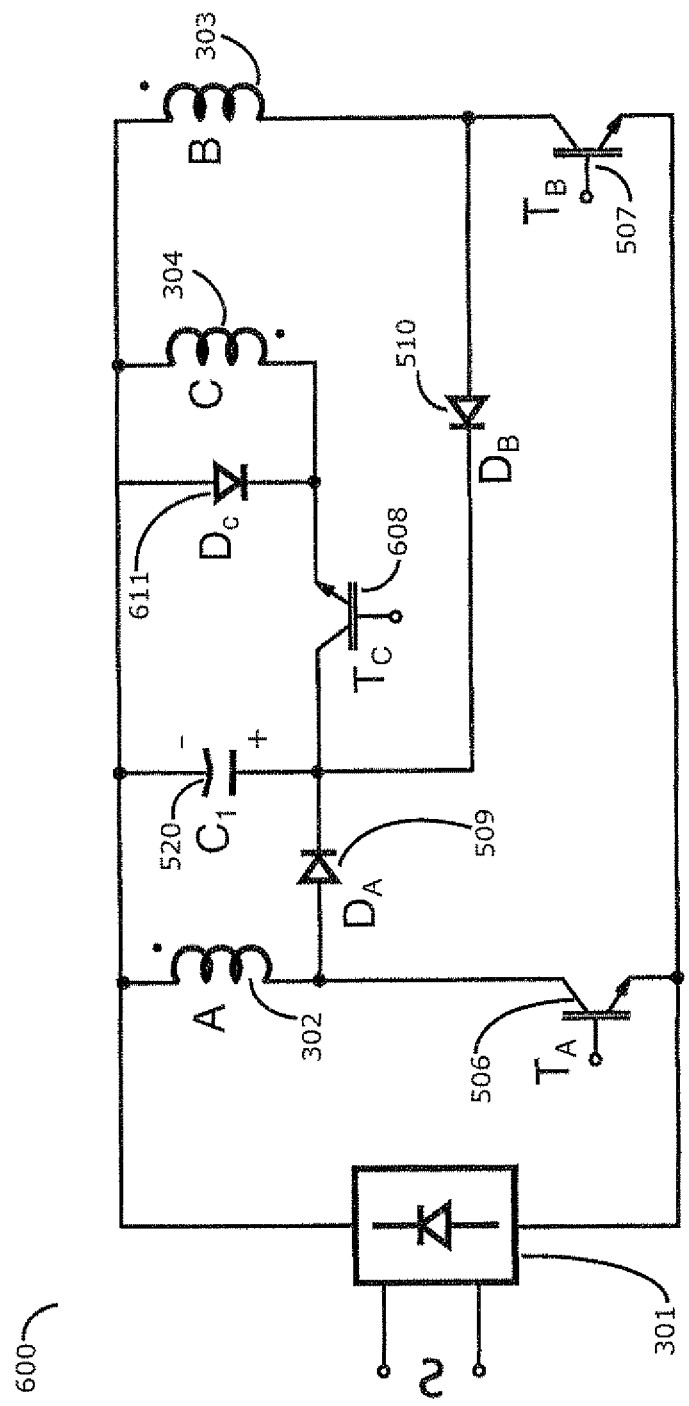
FIG. 6 illustrates a fourth embodiment of the power converter defined by the invention.

FIG. 6 illustrates a fourth, embodiment of the power converter defined by the invention. Power converter 600 is similar to power converter 500 but includes an additional transistor 608 to regulate the simultaneous conduction of current through common winding 304 and either of phase-A winding 302 or phase-B winding 303. Transistor 608 controls the energization of common winding 304 independently of the energization of phase-A winding 302 or phase-B winding 303. Power converter 600 also includes an additional diode 611 for discharging energy stored by common winding 304.

Transistor 506 is switched on to energize phase-A winding 302 and draw a sinusoidal current from the ac supply. When transistor 506 is switched off, current in phase-A winding 302 commutates through diode 509 and charges capacitor 520. If transistor 608 is also switched on, energy from phase-A winding 302 will not only charge capacitor 520 but will also energize common winding 304. If transistor 608 is switched off while common winding 304 is energized, the current in common winding 304 will freewheel through diode 611 and decay slowly, if current in phase-A winding 302 is fully commutated while transistor 608 remains on, energy from capacitor 520 will discharge through common winding 304.

Similarly phase-B winding 303 is energized by switching transistor 507 on and off to draw sinusoidal current from the ac supply, while generating the desired torque in the SRM. Phase-B winding discharges stored energy by conducting current through diode 510 and capacitor 520. When transistor 608 is switched on while capacitor 520 is charged, this charge is discharged through the conduction of current through switch 608 and common winding 304.

The anode of common winding 304's freewheeling diode 611 is connected to the positive or upper rail of the output of rectifier 301. Diode 611 prevents energy within common winding 304 from being discharged into phase-A winding 302 or phase-B winding 303.

Figure 7:
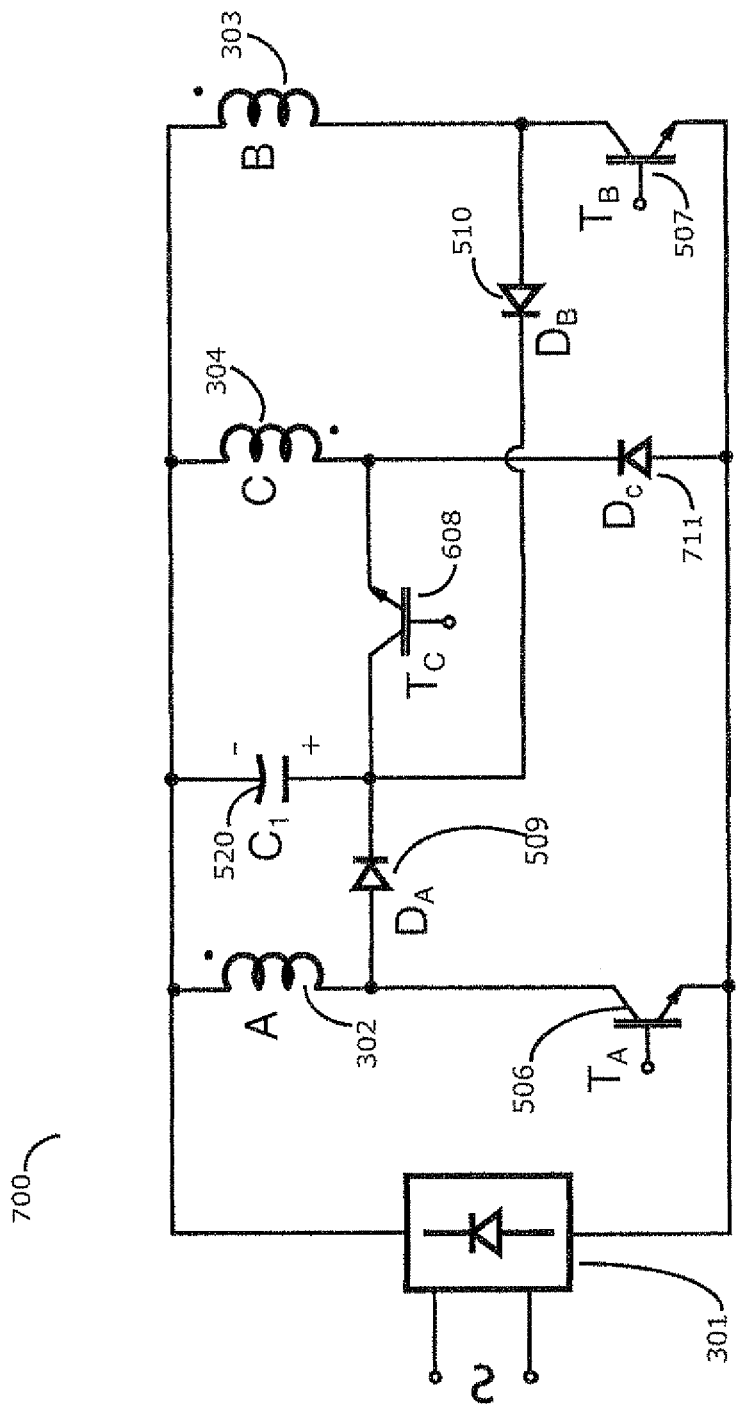
FIG. 7 illustrates a fifth embodiment of the power converter defined by the invention.

FIG. 7 illustrates a fifth embodiment of the power converter defined by the invention. Power converter 700 is similar to power converter 600 but replaces diode 611 with a diode 711 that has its cathode connected to common winding 304 and its anode connected to the negative or lower rail of the output of rectifier 301. Diode 711 supports the transfer of energy stored within common winding 304 back to phase-A winding 302 and transistor 506 or phase-B winding 303, transistor 507, and diode 711.

Transistor 506 is switched on to energize phase-A winding 302 and draw a sinusoidal current from the ac supply. When transistor 506 is switched off, current in phase-A winding 302 flows through diode 509 and charges capacitor 520. If transistor 608 is also switched on, energy from phase-A winding 302 will not only charge capacitor 520 but will also energize common winding 304. If transistor 608 is switched off while common winding 304 is energized, the current in common winding 304 will need an alternative path to flow. Thus, when common winding 304 is energized and transistor 608 is switched off, either transistor 506 or 507 needs to be switched on to provide a path for the current in common winding 304. A failure to switch on one or both of transistors 506 and 507 while transistor 608 is switched off and a current is flowing in common winding 304 will result in a failure of power converter 700.

Three objectives for maximizing torque and power output in SRM drives are: (1) quickly commutating phase currents; (2) applying energy stored in a capacitor, which recovers energy from phase windings (not the dc link capacitor), to a common winding so as to maximize flux for a torque generating phase; and (3) charging the capacitor, which recovers energy from the phase windings (not the dc link capacitor), without interference from the common winding or any other extraneous factor. To achieve these objectives, power converter 700 must has the operational features described below.

When either of transistors 506 and 507 are switched off, transistor 608 is switched off so that capacitor 520 receives the energy stored in phase-A winding 302 or phase-B winding 303, rather than common winding 304. By turning off transistors 506, 507, 608 in this fashion, the current commutation of phases is achieved without any hindrance from common winding 304.

During one phase's current commutation, a path for the flow of current in energized common winding 304 is always available through the phase that is being initiated for current conduction. For example, if phase-A winding 302 is being commutated, then transistor 507 is switched on to energize phase-B winding 303 while transistors 506 and 608 are turned off; because transistor 507 is switched on energized common winding 304 can be discharged by conducting current through phase-B winding 303, transistor 507, and diode 711.

When phase-A winding 302 is being commutated, phase-B winding 303 is being initiated for current conduction and transistor 608 is turned off. During this time, transistor 507 has to be modulated to control current in phase-B winding 303 by turning transistor 507 off for some duration in each pulse width modulation cycle (PWM cycle). If transistor 507 is switched off, there is no path available for common winding 304's current. By turning on transistor 608, a path for current in common winding 304 is available, through capacitor 520. Therefore, the turn-off duration of transistor 507 and turn-on duration of transistor 608 are coordinated so that there is always a path for the current in common winding 304. This control step is very critical for the functioning of the circuit and also applies to phase-B winding 303's commutation. More specifically, when the current through phase-B winding 303 is being commutated, transistors 506 and 608 have to be coordinated to ensure a path is available for current in common winding 304.

Figure 10:
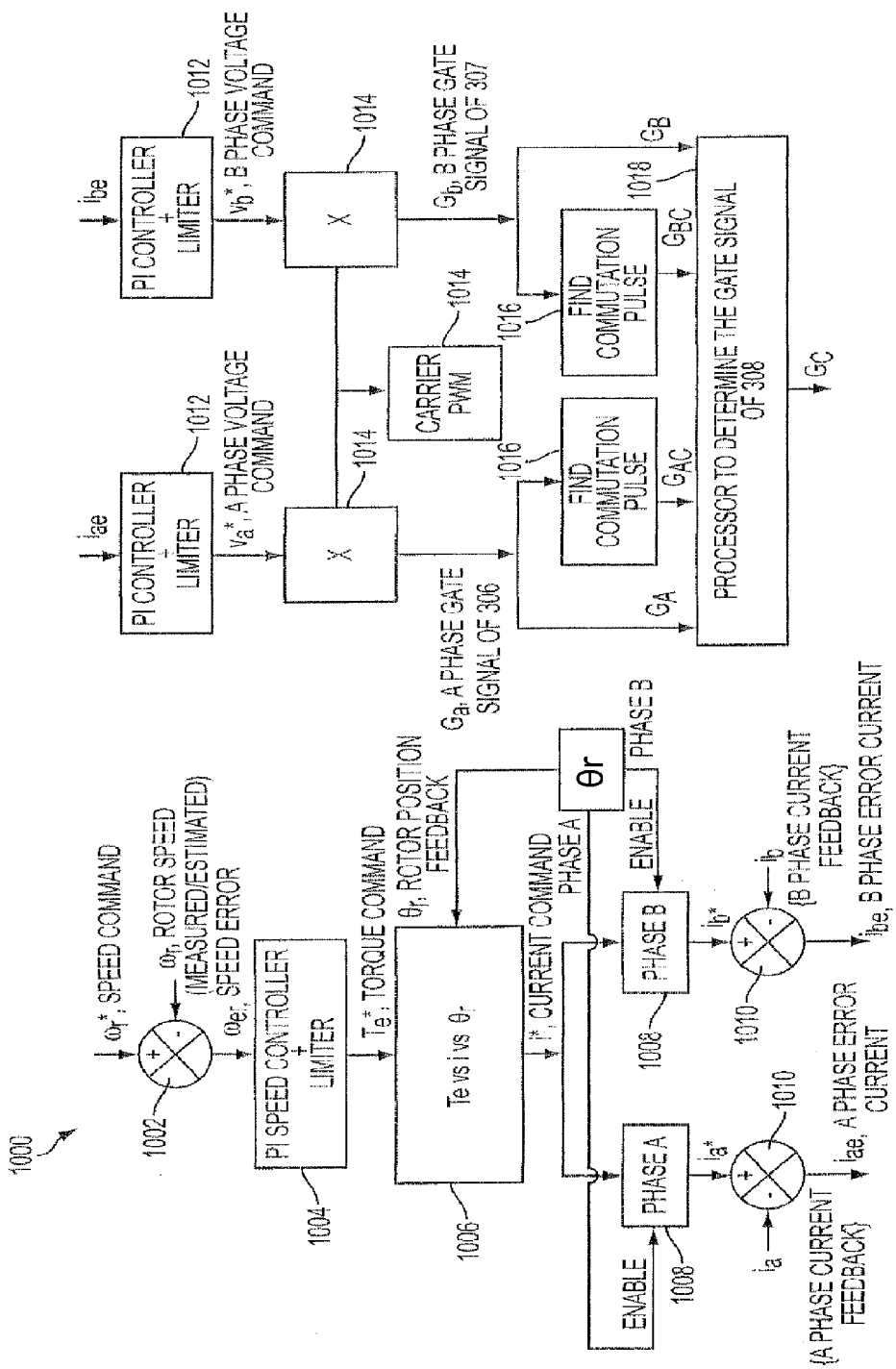
FIG. 10 illustrates a control method for implementing desired operational features of the power converter illustrated by FIG. 9.

FIG. 10 illustrates a control method for implementing desired operational features of power converter 700. Method 1000 compares 1002 a measured or estimated speed of a machine's rotor with a speed command to generate a speed error. The speed error is processed 1004 by a proportional integrator and limiter to generate a torque command. The torque command is processed 1006 with respect to a rotor-position feedback signal to generate a current command. Both the current command and rotor-position feedback signal are processed 1008 to generate signals for enabling the energization of the phase-A and phase-B windings. For each of phases A and B, a phase current feedback signal is compared 1010 with a current command signal to generate a phase-error current signal. Each of the phase-error current signals is processed 1012 by a proportional integrator and limiter to generate respective phase voltage commands, which are modulated 1014 with a carrier PWM signal to generate phase-A and phase-B gating signals $G_A$ and $G_B$, respectively. Gating signals $G_A$ and $G_B$ are processed 1016 to generate phase-A and B commutation gating signals $G_{AG}$ and $G_{BC}$. And gating signals $G_A$, $G_B$, $G_{AG}$, and $G_{BG}$ are processed 1018 to generate a gating signal for energizing a common winding.

Table 1 summarizes the application of control signals, generated by method 1000, to power converter 700. In Table 1, $G_A$, $G_B$, and $G_C$ indicate a gating signal for transistors 506, 507 and 608, respectively, to energize phase-A winding 302, phase-B winding 303 and common winding 304, respectively; $G_{AG}$ and $G_{BG}$ indicate a whether a commutation condition exists for transistors 506 and 507, respectively. For gating signals $G_A$, $G_B$ and $G_C$, in Table 1, a "0" indicates an off condition and a "1" indicates an on condition. For signals $G_{AG}$ and $G_{BC}$, a "0" indicates that the commutation condition does not exist and an "X" indicates that the condition does exist. Parameter $i_A$ is the current through phase-A winding 302, and parameter $i_C$ is the current through common winding 304. The upwards and downwards arrows indicate whether current is increasing or decreasing.

TABLE 1

| $G_A$ | $G_B$ | $G_{AC}$ | $G_{BC}$ | $G_C$ | Comments |
|---|---|---|---|---|---|
| 1 | 1 | 0 | 0 | 1 | $i_c$ inceasing ($i_c \uparrow$) |
| 0 | 1 | X | 0 | 1 | $i_c \uparrow$ |
| 0 | 1 | X | 0 | 0 | $i_c \downarrow$ ($i_c$ decreasing) |
| 1 | 0 | 0 | 0 | 1 | $i_c \uparrow$ |
| 1 | 0 | 0 | 0 | 0 | $i_c \downarrow$ |
| 0 | 1 | 0 | 0 | 1 | $i_c \uparrow$ |
| 0 | 1 | 0 | 0 | 0 | $i_c \downarrow$ |
| 0 | 0 | 0 | 0 | 1 | $i_c \uparrow$ ($i_c > 0$) |
| 1 | 0 | 0 | X | 1 | $i_c \uparrow$ |
| 1 | 0 | 0 | X | 0 | $i_c \downarrow$ |
| 0 | 0 | 0 | X | 1 | $i_c > 0$ |
| 0 | 0 | X | 0 | 1 | $i_c > 0$ |

Within Table 1, the gating logic for transistor 608 is based on the following points. When transistors 506 and 507 are both conducting current, so as to energize both phase A and phase B of the machine, transistor 608 may also conduct current so as to energize common winding 304. And when phases A and B are both conveying current through their respective transistors 506 and 507, transistor 608 can be safely turned off. Similarly, when either one of transistors 506 and 507 is switched on to support the flow of current through its respective phase winding 302, 303, transistor 608 can be switched on and off, conditioned by the current control requirements of common winding 304; the same is true for a situation in which one of transistors 506 and 507 is switched on and the other of the two transistors has a commutation signal common, in that transistor 608 may be switched on and off according to the current control demand for common winding 304.

When both transistors 506 and 507 are turned off and when current in common winding 304 is greater than zero, transistor 608 cannot be turned off until one of the two transistors 506 or 507 is turned on. This is the most severest constraint to be enforced in the control of the motor drive system.

Consider the case where common winding 304 is an independent phase C and not a common winding. When phase C conducts for the same duration as phase A or B, the control switching logic is somewhat similar. The control differs in that phase C is turned on in a sequence of energization of the phases. For clockwise rotation, let the energization sequence be phase A, then B and then C, cyclically. Then, phase C is turned on while phase B is conducting or being commutated. In anti-clockwise rotation of the motor, the energization phase sequence is phase A, then phase C and then phase B, cyclically.

Thus, phase C will be energized during phase As conduction or current commutation. Regardless of whether transistors 506 or 507 are on or off, transistor 608 can be turned on during phase C's period for energization.

When the previously-conducting phase is commutated (A or B depending on the direction of rotation), its transistor 506 or 507 respectively, is turned off; during this mode, transistor 608 cannot be turned off as there is no path for the flow of current in phase C. Therefore, transistor 608 has to be on. Switching transistor 608 on in this fashion may conflict with the current control requirement of phase C. For example, the current in phase C may have to be reduced, but keeping transistor 608 on will increase the current in phase C's winding.

When such a conflict arises, it may be resolved by turning on phases A or B, using their respective transistors 506, 507. However, switching on phase A or phase B at this time may interfere with the current control requirement of phase A or B. For example, phase A or B may be commutating its current. The priority as to commutation of phase A or B or control of current in phase C has to be assigned to resolve the conflict.

When phase A is commutating, phase C is starting to approach its energization region. Delaying phase A's commutation, to accommodate current control in phase C, can be accomplished without much penalty on phase A's commutation by advancing the commutation of phase A. Thus, the time available for phase A's commutation becomes longer and provides flexibility to control phase C's current. The same applies if phase B precedes phase C.

Consider the ease in which phase C has to be commutated. At this time, either phase A or B is being energized or already in conduction. Phase C's commutation can be advanced and that will provide flexibility to resolve the conflict between phase C's commutation and incoming phase A or B current control requirement.

The control strategy identified in Table 1 may be summarized as follows. If the current through common winding 304 is increasing, then switch transistor 608 on. If the current through common winding 304 is greater than zero and both of transistors 506 and 507 are switched off, then transistor 608 must be switched on. If the current through common winding 304 is decreasing and at least one of transistors 506 and 507 is switched on, then transistor 608 may be switched off.

Figure 8:
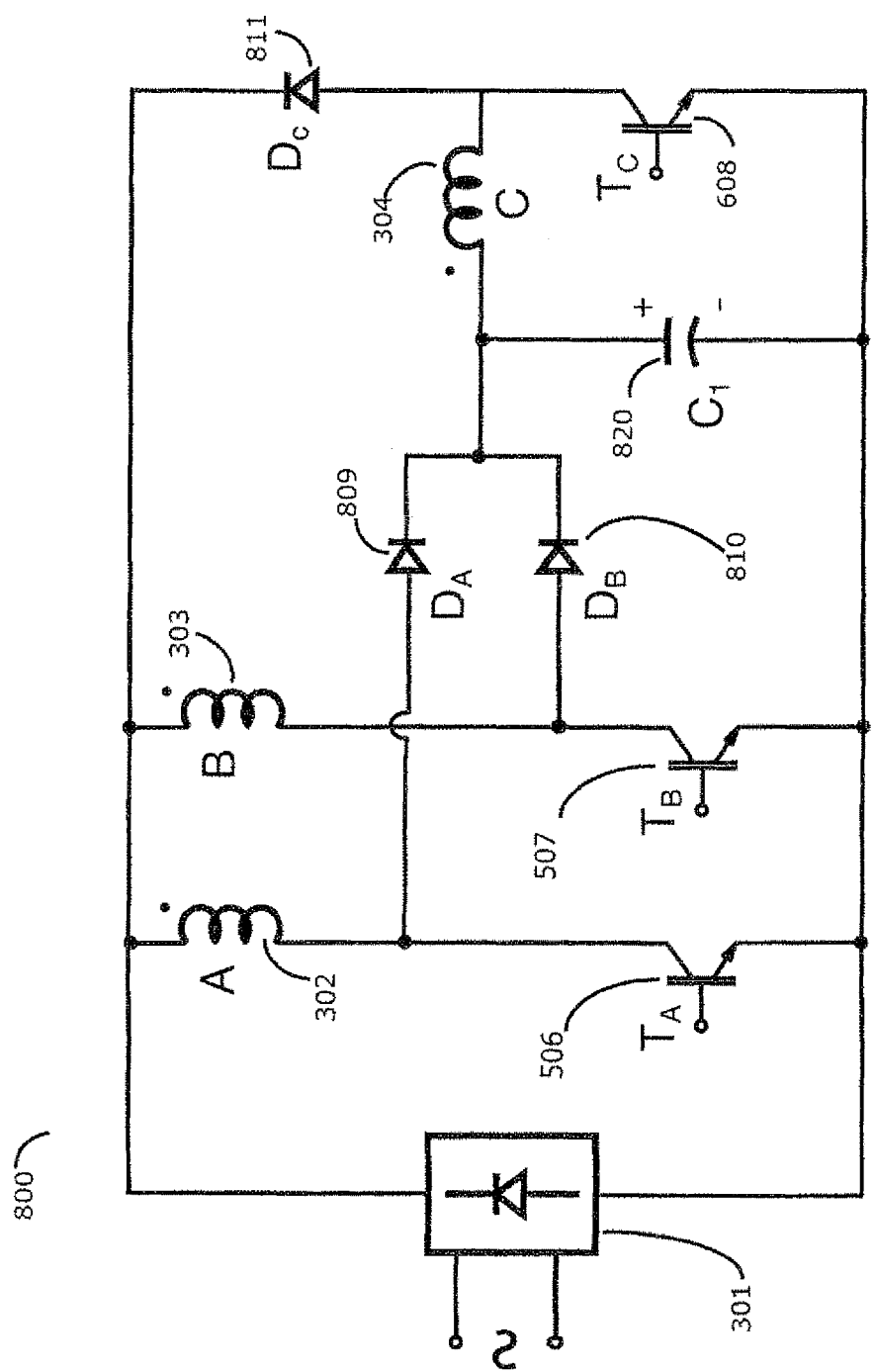
FIG. 8 illustrates a sixth embodiment of the power converter defined by the invention.

FIG. 8 illustrates a sixth embodiment of the power converter defined by the invention. Power converter 800 provides power for a two-phase SRM having a common winding 304 and no dc link capacitor. Power converter 800 operates similarly to power converters 600 and 700. Phase-A winding 302 and phase-B winding 303 are energized to draw sinusoidal current from ac supply 301 as they do in power converters 600 and 700. When phase-A winding 302 is energized and transistor 506 is switched off, energy from phase-A winding 302 is commutated via diode 809 and through: (1) a first path comprising common winding 304 and a diode 811 and (2) a second path comprising a capacitor 820 and rectifier 301; capacitor 820 and common winding 304 are charged by the conduction of current through them.

By turning on transistor 608, energy stored in capacitor 820 is transferred to common winding 304. To discontinue the flow of current in common winding 304, transistor 608 is switched off, and the energy stored in common winding 304 is discharged by the conduction of current through: (1) diode 811, phase-A winding 302, and a freewheeling diode 809, (2) diode 811, phase-B winding 303, and a freewheeling diode 810, or (3) both of the current paths.

If transistors 506 or 507 are switched on while common winding 304 has current flowing through it, then current from common winding 304 will flow through capacitor 820, diode 811, and phase windings A and B. Thus, energy stored in capacitor 820 or common winding 304 can be used to excite phase windings A and B. As a result, the voltage across capacitor 820 can be regulated by discharging its energy through phase winding A or B or both, so as to keep capacitor 820 operating within its voltage rating.

Figure 9:
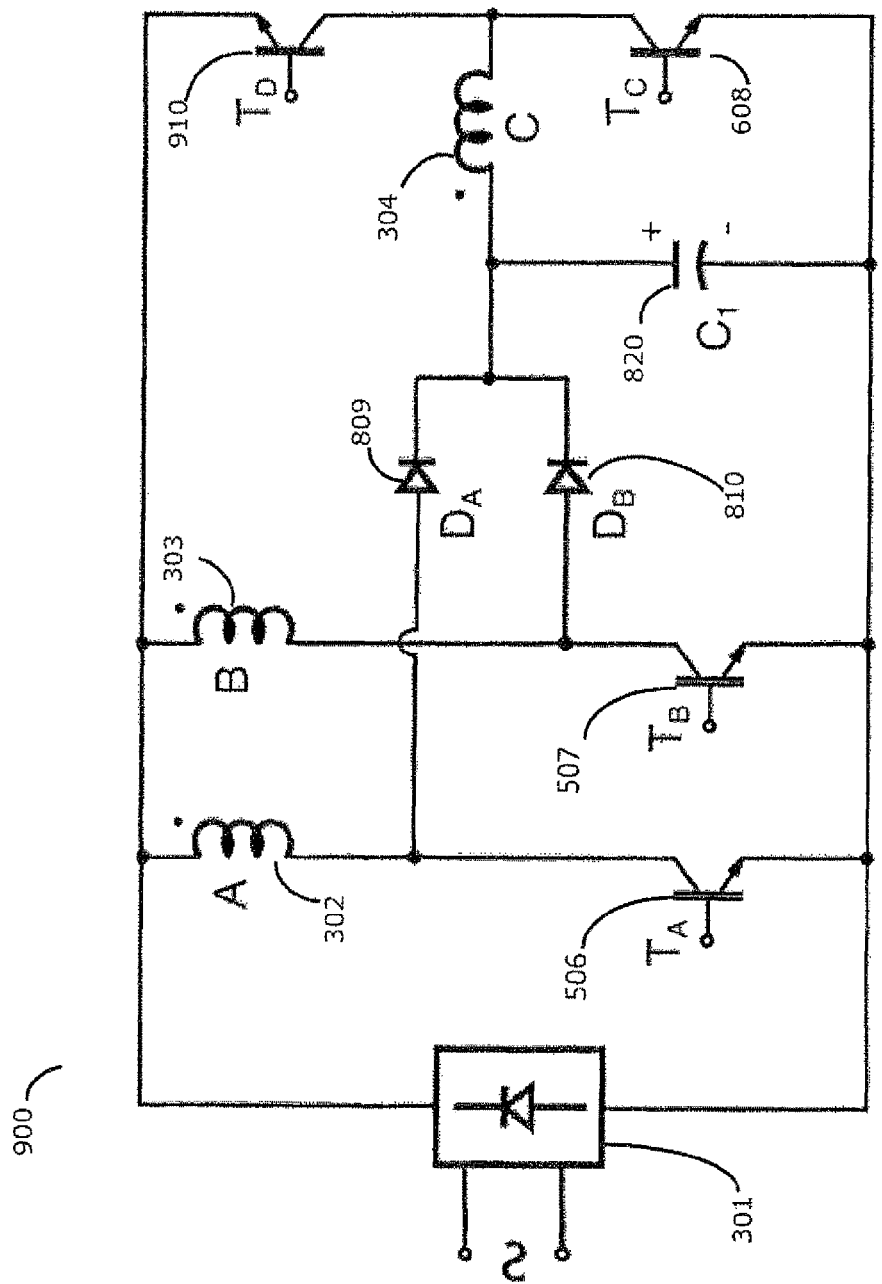
FIG. 9 illustrates a seventh embodiment of the power converter defined by the invention.

FIG. 9 illustrates a seventh embodiment of the power converter defined by the invention. Power converter 900 is identical to power converter 800 except that diode 811 in power converter 800 is replaced by a transistor 910 in power converter 900. Transistor 910 provides an ability to energize phase-A winding 302 and phase-B winding 303 independently of common winding 304.

Table 2 identifies modes of operating of power converter 900 with respect to phase-A winding 302. In Table 2, $i_A$ is the current through phase-A winding 302, $i_C$ is the current through common winding 304, and $v_c$ is the voltage across capacitor 820.

As indicated in Table 2, when: (1) transistor 506 is switched on, (2) transistors 507, 608, and 910 are switched off, and (3) no current is conducted through diodes 809 and 810, then the current conducted through phase-A winding 302 is greater than zero and increasing so as to energize phase A. When transistors 506, 507, 608, and 910 are switched off and current is conducted through diode 809 but not diode 810, then the current conducted through phase-A winding 302 is greater than zero, phase A is de-energizing, and capacitor 820 is being charged by the energy from phase A. When: (1) transistors 506 and 608 are switched on, (2) transistors 507 and 910 are switched off, and (3) no current is conducted through diodes 809 and 810, then current conducted through phase-A winding 302 is greater than zero and current conducted through common winding 304 is greater than zero. When: (1) transistors 506 and 910 are switched on, (2) transistors 507 and 608 are switched off, and (3) no current is conducted through diodes 809 and 810, then current conducted through phase-A winding 302 is greater than zero and current conducted through common winding 304 decreases. When: (1) transistor 910 is switched on, (2) transistors 506, 507, and 608 are switched off, and (3) current is conducted through diode 809 but not diode 810, then current conducted through phase-A winding 302 decreases and current conducted through common winding 304 decreases.

For the modes of operation identified in Table 2 in which all transistors are switched off except transistor 910, phase-B winding 303 may also conduct a current. This feature ensures there is a path for current from common winding 304 to flow at all times, so long as one of transistors 808 and 910 is on.

TABLE 2

| $T_A$ 506 | $T_B$ 507 | $D_A$ 809 Current | $D_B$ 810 Current | $T_C$ 608 | $T_D$ 910 | Outcome |
|---|---|---|---|---|---|---|
| On  | Off | No  | No | Off | Off | $i_A > 0, i_A \uparrow$ |
| Off | Off | Yes | No | Off | Off | $i_A > 0$ |
| Off | Off | Yes | No | Off | Off | $i_A > 0, v_c \uparrow$ |
| On  | Off | No  | No | On  | Off | $i_A > 0, i_C > 0$ |
| On  | Off | No  | No | Off | On  | $i_A > 0, i_C \downarrow$ |
| Off | Off | Yes | No | Off | On  | $i_A \downarrow, i_c \downarrow$ |

Features of the invention include: (1) a power converter having a dc link capacitor and a common winding that is used to draw a near sinusoidal current and drive a suitable SRM of two or more phases; (2) a common winding around the back iron of a stator or around common poles; (3) different numbers of winding turns for two-phase windings to provide reduced torque capability for power factor correction; (4) flux from a common winding or phase for power factor correction is additive with the another phase; (5) a common winding is disposed at a location of a stator back iron where no flux reversal occurs; (6) flux from a common winding is additive with that of another phase; (7) a common winding is a motor phase that has reduced torque capability and is used for power factor correction; (8) a machine having one main phase and an auxiliary phase or winding around the back iron that may or may not be used for power factor correction; (9) a machine having one main phase and an auxiliary phase or winding around the back iron that is used as a regular motor phase; (10) a phase with reduced torque capability; (11) a power converter with or without a dc link capacitor; and (12) a common winding or lesser machine phase that is only used for regular operation of the SRM, not power factor correction.

The foregoing has been a detailed description of possible embodiments of the invention. Other embodiments of the invention will be apparent to those skilled in the art from consideration of the specification and practice of the invention. Accordingly, it is intended that this specification and its disclosed embodiments be considered as exemplary only, with the true scope and spirit of the invention being indicated by the following claims.

What is claimed is:

1. An electrical device comprising:
   a capacitive storage element; and
   first and second switches, wherein:
   the capacitive storage element and first and second switches are interconnected such that when interconnected with a direct current (dc) voltage supply and first and second windings of an electrical machine:
   a first operational state exists in which conductive states of the first and second switches cause the dc voltage supply to conduct current through the first winding and the first switch and conduct current through the first and second switches and the second winding, respectively, thereby storing energy within the first and second windings, and
   a second operational state exists in which non-conductive states of the first and second switches cause each of the first and second windings to discharge stored energy by conducting current through the capacitive storage element, thereby storing energy in the capacitive storage element.

2. The electrical device of claim 1, wherein a third operational state exists in which the conductive state of the first switch and the non-conductive state of the second switch cause the dc voltage supply to conduct current through the first winding and the first switch and discharge energy stored by the second winding by conducting a current through the first switch, thereby energizing the first winding and de-energizing the second winding.

3. The electrical device of claim 1, wherein a third operational state exists in which the non-conductive state of the first switch and the conductive state of the second switch cause the dc voltage supply to conduct current through the first winding and capacitive storage element and cause the second winding to discharge stored energy by conducting current through the capacitive storage element, thereby charging the capacitive storage element.

4. The electrical device of claim 1, wherein a third operational state exists in which the non-conductive states of the first and second switches cause the first winding to discharge stored energy by conducting current through the capacitive storage element and cause the second winding to discharge stored energy by conducting current through the capacitive storage element, thereby charging the capacitive storage element.

5. The electrical device of claim 1, further comprising:
   first, second, and third unidirectional current devices that each conducts current unidirectionally, wherein
   the second winding discharges stored energy in the second operational state by conducting current through an electrical circuit consisting of the electrical interconnection of the second winding, first, second and third unidirectional current devices, and capacitive storage element.

6. The electrical device of claim 1, further comprising:
   first and second unidirectional current devices that each conducts current unidireetionally, wherein
   the second winding discharges stored energy in the second operational state by conducting current through an electrical circuit consisting of the electrical interconnection of the second winding, first and second unidirectional current devices, and capacitive storage element.

7. The electrical device of claim 1, further comprising:
   a third switch, wherein:
   the capacitive storage element and first, second, and third switches are interconnected such that when interconnected with the dc voltage supply, the first and second windings, and a third winding of the electrical machine:
   a third operational state exists in which the conductive state of the first switch and a conductive state of the third switch cause the dc voltage supply to conduct current through the first winding and the first switch and to conduct current through the first and third switch and third winding, thereby storing energy within the first and third windings, and
   a fourth operational state exists in which the non-conductive state of the first switch and a non-conductive state of the third switch cause each of the first and third windings to discharge stored energy by conducting current through the capacitive storage element, thereby storing energy in the capacitive storage element.

8. An electrical device comprising:
a capacitive storage element; and
a first switch, wherein:
the capacitive storage element and first switch are interconnected such that when interconnected with a direct current (dc) voltage supply and first and second windings of an electrical machine:
   a first operational state exists in which a conductive state of the first switch causes the dc voltage supply to conduct current through the first winding and first switch,
   a second operational state exists in which a non-conductive state of the first switch causes the first winding to discharge stored energy by conducting current through the capacitive storage element, thereby storing energy in the capacitive storage element, and
   a third operational state exists in which the capacitive storage element discharges stored energy by conducting current through the second winding, thereby storing energy in the second winding.

9. The electrical device of claim 8, further comprising:
first and second unidirectional current devices that each conducts current unidirectionally, wherein:
the first winding discharges stored energy in the second operational state by conducting current through an electrical circuit consisting of the electrical interconnection of the first winding, first unidirectional current device, and capacitive storage element, and
the capacitive storage discharges stored energy in the third operational state by conducting current through an electrical circuit consisting of the electrical interconnection of the capacitive storage element, second unidirectional current device, and second winding.

10. The electrical device of claim 8, further comprising:
a second switch, wherein:
the capacitive storage element and first and second switches are interconnected such that when interconnected with the dc voltage supply, the first and second windings, and a third winding of the electrical machine:
   a fourth operational state exists in which a conductive state of the second switch causes the dc voltage supply to conduct current through the third winding and second switch, and
   a fifth operational state exists in which a non-conductive state of the second switch causes the second winding to discharge stored energy by conducting current through the capacitive storage element, thereby storing energy in the capacitive storage element.

11. The electrical device of claim 8, further comprising:
a second switch having current conductive and non-conductive states, wherein
the second switch conducts current, while in the current conductive state, from the capacitive storage element to the second winding during the third operational state, thereby storing energy in the second winding.

12. The electrical device of claim 11, further comprising:
a unidirectional current device that conducts current unidirectionally, wherein
the second winding discharges stored energy in a fourth operational state by conducting current through an electrical circuit consisting of the electrical interconnection of the second winding and unidirectional current device.

13. The electrical device of claim 11, further comprising:
a unidirectional current device that conducts current unidirectionally, wherein
the second winding discharges stored energy in a fourth operational state by conducting current through an electrical circuit consisting of the electrical interconnection of the first and second windings, first switch, and unidirectional current device, thereby storing energy in the first winding.

14. An electrical device comprising:
a capacitive storage element; and
first and second switches, wherein:
the capacitive storage element and first and second switches are interconnected such that when interconnected with a direct current (dc) voltage supply and first and second windings of an electrical machine:
   a first operational state exists in which a conductive state of the first switch causes the dc voltage supply to conduct current through the first winding and first switch,
   a second operational state exists in which a non-conductive state of the first switch causes the first winding to discharge stored energy by conducting current through the capacitive storage element and dc voltage supply, thereby storing energy in the capacitive storage element,
   a third operational state exists in which a conductive state of the second switch causes the capacitive storage element to discharge stored energy by conducting current through the second winding, thereby storing energy in the second winding, and
   a fourth operational state exists in which a non-conductive state of the second switch causes the second winding to discharge stored energy by conducting current through the first winding, thereby storing energy in the first winding.

15. The electrical device of claim 14, further comprising:
a third switch, wherein:
the capacitive storage element and first, second, and third switches are interconnected such that when interconnected with the dc voltage supply, the first and second windings, and a third winding of the electrical machine:
   a fifth operational state exists in which a conductive state of the third switch causes the dc voltage supply to conduct current through the third winding, thereby storing energy within the third winding, and
   a sixth operational state exists in which a non-conductive state of the third switch causes the third winding to discharge stored energy by conducting current through the capacitive storage element, thereby storing energy in the capacitive storage element.

16. The electrical device of claim 14, further comprising:
first and second unidirectional current devices that each conducts current unidirectionally, wherein
the second winding discharges stored energy during the fourth operational state by conducting current through an electrical circuit consisting of the electrical interconnection of the: (1) first and second windings, first unidirectional current device, first switch, and capacitive storage element or (2) first and second windings and first and second unidirectional current devices.

17. The electrical device of claim 16, wherein the first unidirectional current device is a switch that conducts current in a current conduction state and does not conduct current in a current non-conduction state.

18. An electrical machine comprising:
a direct current (dc) voltage supply that has first and second electrical terminals;
first and second windings of the electrical machine, each of the first and second windings having first and second electrical terminals;
a capacitive storage element that has first and second electrical terminals;
first and second switches that each has first and second electrical terminals; and
first, second, and third unidirectional current devices that each conducts current unidirectionally and has first and second electrical terminals, wherein:
a first electrical node connects the first terminal of the dc voltage supply and first terminal of the first winding,
a second electrical node connects the second terminal of the first winding, first terminals of the first switch and first unidirectional current device, and second terminal of the second unidirectional current device,
a third electrical node connects the second terminal of the first unidirectional current device and first terminals of the capacitive storage element and second switch,
a fourth electrical node connects the second terminal of the second switch, first terminal of the second winding, and second terminal of the third unidirectional current device,
a fifth electrical node connects the second terminal of the second winding and first terminal of the second unidirectional current device, and
a sixth electrical node connects the second terminals of the dc voltage supply, first switch, and capacitive storage element and the first terminal of the third unidirectional current device.

19. The electrical machine of claim 18, further comprising:
a third winding of the electric machine that has first and second electrical terminals;
a third switch that has first and second electrical terminals; and
fourth and fifth unidirectional current devices that each conducts current unidirectionally and has first and second electrical terminals, wherein:
a seventh electrical node connects the first terminal of the third winding and second terminal of the fifth unidirectional current device,
an eighth electrical node connects the second terminal of the third winding and first terminal of the fourth unidirectional current device,
the second terminal of the fourth unidirectional current device is connected to the second node,
the first terminal of the third switch is connected to the third node, and
the first terminal of the fifth unidirectional current device is connected to the sixth node.

20. The electrical machine of claim 19, further comprising:
a stator having first stator poles, second stator poles, and a flux-conductive back-arm that interconnects the first and second stator poles, wherein:
the first winding is disposed around the stator back-arm so as to generate flux in the stator back-arm when energized by the conduction of current,
the second winding is disposed around the first stator poles so as to generate flux in the first stator poles when energized by the conduction of current,
the third winding is disposed around the second stator poles so as to generate flux in the second stator poles when energized by the conduction of current, and
the first winding is wound around the stator back-arm at locations where fluxes, generated by the second and third windings and conveyed by the stator back-arm, are conducted in opposite circumferential directions but never reverse direction.

21. The electrical machine of claim 19, further comprising:
a stator having first stator poles, second stator poles, and third stator poles, wherein:
the first winding is disposed around the first stator poles so as to generate flux in the first stator poles when energized by the conduction of current;
the second winding is disposed around the second stator poles so as to generate flux in the second stator poles when energized by the conduction of current, and
the third winding is disposed around the third stator poles so as to generate flux in the third stator poles when energized by the conduction of current.

22. The electrical machine of claim 21, further comprising:
a rotor, wherein
all of the flux generated by each of the second and third windings is conveyed to the first stator poles by the rotor.

23. An electrical machine comprising:
a direct current (dc) voltage supply that has first and second electrical terminals;
first and second windings of the electrical machine, each of the first and second windings having first and second electrical terminals;
a capacitive storage element that has first and second electrical terminals;
first and second switches that each has first and second electrical terminals; and
first and second unidirectional current devices that each conducts current unidirectionally and has first and second electrical terminals, wherein:
a first electrical node connects the first terminal of the dc voltage supply and first terminal of the first winding,
a second electrical node connects the second terminal of the first winding, first terminals of the first switch and first unidirectional current device, and second terminal of the second winding,
a third electrical node connects the second terminal of the first unidirectional current device and first terminals of the capacitive storage element and second switch,
a fourth electrical node connects the second terminal of the second switch, first terminal of the second winding, and second terminal of the second unidirectional current device, and
a fifth electrical node connects the second terminal of the dc voltage supply, second terminals of the first switch and capacitive storage element, and first terminal of the second unidirectional current device.

24. The electrical machine of claim 23, further comprising:
a third winding of the electric machine that has first and second electrical terminals;
a third switch that has first and second electrical terminals; and
a third unidirectional current device that conducts current unidirectionally and has first and second electrical terminals, wherein:
a sixth electrical node connects the first terminal of the third winding, second terminal of the third unidirectional current device, and second terminal of the third switch,
the second terminal of the third winding is connected to the second node,
the first terminal of the third switch is connected to the third node, and the first terminal of the third unidirectional current device is connected to the fifth node.

25. The electrical machine of claim 24, further comprising:
a stator having first stator poles, second stator poles, and a flux-conductive back-arm that interconnects the first and second stator poles, wherein:
the first winding is disposed around the stator back-arm so as to generate flux in the stator back-arm when energized by the conduction of current,
the second winding is disposed around the first stator poles so as to generate flux in the first stator poles when energized by the conduction of current,
a third winding is disposed around the second stator poles so as to generate flux in the second stator poles when energized by the conduction of current, and
the first winding is wound around the stator back-arm at locations where fluxes, generated by the second and third windings and conveyed by the stator back-arm, are conducted in opposite circumferential directions but never reverse direction.

26. The electrical machine of claim 24, further comprising:
a stator having first stator poles, second stator poles, and third stator poles, wherein:
the first winding is disposed around the first stator poles so as to generate flux in the first stator poles when energized by the conduction of current;
the second winding is disposed around the second stator poles so as to generate flux in the second stator poles when energized by the conduction of current, and
the third winding is disposed around the third stator poles so as to generate flux in the third stator poles when energized by the conduction of current.

27. The electrical machine of claim 26, further comprising:
a rotor, wherein
all of the flux generated by each of the second and third windings is conveyed to the first stator poles by the rotor.

28. An electrical machine comprising:
a direct current (dc) voltage supply that has first and second electrical terminals;
first and second windings of the electrical machine, each of the first and second windings having first and second electrical terminals;
a capacitive storage element that has first and second electrical terminals;
first and second switches that each has first and second electrical terminals; and
first and second unidirectional current devices that each conducts current unidirectionally and has first and second electrical terminals, wherein:
a first electrical node connects the first terminal of the dc voltage supply, first terminal of the first winding, and second terminals of the capacitive storage element and second winding,
a second electrical node connects the second terminal of the first winding and first terminals of the first switch and first unidirectional current device,
a third electrical node connects the second terminal of the first unidirectional current device and first terminals of the capacitive storage element and second unidirectional current device,
a fourth electrical node connects the second terminal of the second unidirectional current device and first terminal of the second winding, and
a fifth electrical node connects the second terminal of the dc voltage supply and second terminal of the first switch.

29. The electrical machine of claim 28, further comprising:
a third winding of the electric machine that has first and second electrical terminals;
a third switch that has first and second electrical terminals; and
a third unidirectional current device that conducts current unidirectionally and has first and second electrical terminals, wherein:
a sixth electrical node connects the first terminal of the third switch, first terminal of the third unidirectional current device, and second terminal of the third winding,
the first terminal of the third winding is connected to the first node,
the second terminal of the third unidirectional current device is connected to the third node, and
the second terminal of the third switch is connected to the fifth node.

30. The electrical machine of claim 29, further comprising:
a stator having first stator poles, second stator poles, and a flux-conductive back-arm that interconnects the first and second stator poles, wherein:
the first winding is disposed around the first stator poles so as to generate flux in the first stator poles when energized by the conduction of current,
the second winding is disposed around the stator back-arm so as to generate flux in the stator back-arm when energized by the conduction of current,
the third winding is disposed around the second stator poles so as to generate flux in the second stator poles when energized by the conduction of current, and
the second winding is wound around the stator back-arm at locations where fluxes, generated by the first and third windings and conveyed by the stator back-arm, are conducted in opposite circumferential directions but never reverse direction.

31. The electrical machine of claim 29, further comprising:
a stator having first stator poles, second stator poles, and third stator poles, wherein:
the first winding is disposed around the first stator poles so as to generate flux in the first stator poles when energized by the conduction of current;
the second winding is disposed around the second stator poles so as to generate flux in the second stator poles when energized by the conduction of current, and
the third winding is disposed around the third stator poles so as to generate flux in the third stator poles when energized by the conduction of current.

32. The electrical machine of claim 31, further comprising:
a rotor, wherein
all of the flux generated by each of the first and third windings is conveyed to the second stator poles by the rotor.

33. The electrical machine of claim 28, further comprising:
a third unidirectional current device that conducts current unidirectionally and has first and second electrical terminals, wherein:
the second unidirectional current device is a switch that has states of current conduction and non-conduction,
the first terminal of the third unidirectional current device is connected to the first node, and
the second terminal of the third unidirectional current device is connected to the fourth node.

34. The electrical machine of claim 28, further comprising:
a third unidirectional current device that conducts current unidirectionally and has first and second electrical terminals, wherein:
the second unidirectional current device is a switch that has states of current conduction and non-conduction, the first terminal of the third unidirectional current device is connected to the fifth node, and the second terminal of the third unidirectional current device is connected to the fourth node.

35. An electrical machine comprising:
a direct current (dc) voltage supply that has first and second electrical terminals;
first and second windings of the electrical machine, each of the first and second windings having first and second electrical terminals;
a capacitive storage element that has first and second electrical terminals;
first and second switches that each has first and second electrical terminals; and
first and second unidirectional current devices that each conducts current unidirectionally and has first and second electrical terminals, wherein:
a first electrical node connects the first terminal of the dc voltage supply, first terminal of the first winding, and second terminal of the second unidirectional current device,
a second electrical node connects the second terminal of the first winding and first terminals of the first switch and first unidirectional current device,
a third electrical node connects the second terminal of the first unidirectional current device and first terminals of the capacitive storage element and second winding,
a fourth electrical node connects the first terminals of the second switch and second unidirectional current device and second terminal of the second winding, and
a fifth electrical node connects the second terminals of the dc voltage supply, first and second switches, and capacitive storage element.

36. The electrical machine of claim 35, further comprising:
a third winding of the electric machine that has first and second electrical terminals;
a third switch that has first and second electrical terminals; and
a third unidirectional current device that conducts current unidirectionally and has first and second electrical terminals, wherein:
a sixth electrical node connects the first terminal of the third switch, first terminal of the third unidirectional current device, and second terminal of the third winding,
the first terminal of the third winding is connected to the first node,
the second terminal of the third unidirectional current device is connected to the third node, and
the second terminal of the third switch is connected to the fifth node.

37. The electrical machine of claim 36, further comprising:
a stator having first stator poles, second stator poles, and a flux-conductive back-arm that interconnects the first and second stator poles, wherein:
the first winding is disposed around the first stator poles so as to generate flux in the first stator poles when energized by the conduction of current,
the second winding is disposed around the stator back-arm so as to generate flux in the stator back-arm when energized by the conduction of current,
the third winding is disposed around the second stator poles so as to generate flux in the second stator poles when energized by the conduction of current, and
the second winding is wound around the stator back-arm at locations where fluxes, generated by the first and third windings and conveyed by the stator back-arm, are conducted in opposite circumferential directions but never reverse direction.

38. The electrical machine of claim 36, further comprising:
a stator having first stator poles, second stator poles, and third stator poles, wherein:
the first winding is disposed around the first stator poles so as to generate flux in the first stator poles when energized by the conduction of current;
the second winding is disposed around the second stator poles so as to generate flux in the second stator poles when energized by the conduction of current, and
the third winding is disposed around the third stator poles so as to generate flux in the third stator poles when energized by the conduction of current.

39. The electrical machine of claim 38, further comprising:
a rotor, wherein
all of the flux generated by each of the first and third windings is conveyed to the second stator poles by the rotor.

40. The electrical machine of claim 35, wherein the second unidirectional current device is a switch that has states of current conduction and non-conduction.

41. A method of operating an electrical machine having first and second phase windings and a common winding, the method comprising:
determining whether each of the first and second phase windings is being energized by the flow of current;
determining whether current flow through a capacitive storage element, which stores energy discharged by the de-energization of the first and second phase windings, is increasing, decreasing, or positive;
discharging energy stored by the capacitive storage element through the common winding if the current flow through the capacitive storage element is determined to be increasing;
discharging energy stored by the capacitive storage element through the common winding if the current flow through the capacitive storage element is determined to be a positive current flow and neither of the first and second phase windings is being energized; and
discontinuing the discharge of energy stored by the capacitive storage element through the common winding if the current flow through the capacitive storage element is determined to be decreasing and at least one of the first and second phase windings is being energized.

* * * * *